United States Patent
Huffman et al.

(10) Patent No.: US 10,681,429 B2
(45) Date of Patent: **\*Jun. 9, 2020**

(54) SYSTEM AND METHOD FOR INTERNET PROTOCOL TELEVISION PRODUCT PLACEMENT DATA

(71) Applicant: AT&T INTELLECTUAL PROPERTY I, LP, Atlanta, GA (US)

(72) Inventors: James Huffman, Garden Grove, CA (US); Frank Coppa, Kansas City, MO (US); Larry Kennedy, Lawrence, KS (US)

(73) Assignee: AT&T Intellectual Property I, L.P., Atlanta, GA (US)

(\*) Notice: Subject to any disclaimer, the term of this patent is extended or adjusted under 35 U.S.C. 154(b) by 189 days.

This patent is subject to a terminal disclaimer.

(21) Appl. No.: 15/079,546

(22) Filed: Mar. 24, 2016

(65) Prior Publication Data
US 2016/0205445 A1 Jul. 14, 2016

Related U.S. Application Data

(63) Continuation of application No. 13/767,449, filed on Feb. 14, 2013, now Pat. No. 9,578,388, which is a
(Continued)

(51) Int. Cl.
*H04N 7/16* (2011.01)
*H04N 7/167* (2011.01)
(Continued)

(52) U.S. Cl.
CPC ........ *H04N 21/812* (2013.01); *G06Q 30/02* (2013.01); *G06Q 30/0251* (2013.01); *G06Q 30/0255* (2013.01); *H04N 21/25891* (2013.01); *H04N 21/2668* (2013.01); *H04N 21/26613* (2013.01); *H04N 21/4353* (2013.01); *H04N 21/4532* (2013.01); *H04N 21/6125* (2013.01); *H04N 21/6175* (2013.01)

(58) Field of Classification Search
CPC ........ H04N 21/812; H04N 21/25891; H04N 21/26613; H04N 21/2668; H04N 21/4353; H04N 21/4532; H04N 21/6125; H04N 21/6175; G06Q 30/02; G06Q 30/0251; G06Q 30/0255
See application file for complete search history.

(56) References Cited

U.S. PATENT DOCUMENTS 6,460,036 B1   10/2002   Herz et al.
7,124,001 B2   10/2006   Li et al.
(Continued)

*Primary Examiner* — Kyu Chae
(74) *Attorney, Agent, or Firm* — Guntin & Gust, PLC; Douglas Schnabel

(57) ABSTRACT

A system and method are disclosed for sending advertising data to an end user device. The system includes but is not limited to a processor in data communication with a computer readable medium; and a computer program embedded in the computer readable medium, the computer program including but not limited to instructions to send first password data to a first group of end user devices that have exchanged a first advertising key data in a first advertising category; and instructions to send first advertising data encoded using the first password to the first group of end user devices.

14 Claims, 5 Drawing Sheets

Related U.S. Application Data continuation of application No. 12/182,637, filed on Jul. 30, 2008, now Pat. No. 8,380,564.

(51) Int. Cl.
*G06Q 30/00* (2012.01)
*H04N 21/81* (2011.01)
*H04N 21/45* (2011.01)
*G06Q 30/02* (2012.01)
*H04N 21/2668* (2011.01)
*H04N 21/258* (2011.01)
*H04N 21/266* (2011.01)
*H04N 21/435* (2011.01)
*H04N 21/61* (2011.01)

(56) References Cited

U.S. PATENT DOCUMENTS

| | | |
|---|---|---|
| 7,143,428 B1 | 11/2006 | Bruck et al. |
| 7,490,091 B2 | 2/2009 | Lunenfeld et al. |
| 7,593,605 B2 | 9/2009 | King et al. |
| 7,599,844 B2 | 10/2009 | King et al. |
| 7,739,153 B1 | 6/2010 | Anderson et al. |
| 7,814,511 B2 | 10/2010 | MacRae et al. |
| 7,818,215 B2 | 10/2010 | King et al. |
| 7,865,397 B2 | 1/2011 | Makeev et al. |
| 7,884,018 B2 | 2/2011 | McFeely et al. |
| 7,949,722 B1 | 5/2011 | Abato et al. |
| 7,991,770 B2 | 8/2011 | Baluja et al. |
| 8,380,564 B2 * | 2/2013 | Huffman ............... G06Q 30/02 705/14.49 |
| 9,578,388 B2 * | 2/2017 | Huffman ............... G06Q 30/02 |
| 2002/0112249 A1 * | 8/2002 | Hendricks ............. H04H 20/10 725/136 |
| 2003/0192060 A1 * | 10/2003 | Levy ..................... H04N 5/783 725/133 |
| 2008/0031433 A1 | 2/2008 | Sapp et al. |
| 2009/0222530 A1 * | 9/2009 | Buford ................. H04L 12/185 709/217 |
| 2012/0246685 A1 * | 9/2012 | Fink ..................... G06Q 30/02 725/60 |
| 2014/0229980 A1 * | 8/2014 | Bill ....................... G06Q 30/02 725/34 |

* cited by examiner

US 10,681,429 B2

SYSTEM AND METHOD FOR INTERNET PROTOCOL TELEVISION PRODUCT PLACEMENT DATA

CROSS-REFERENCE TO RELATED APPLICATIONS

This application is a continuation of and claims priority to U.S. patent application Ser. No. 13/767,449, filed Feb. 14, 2013, which is a continuation of and claims priority to Ser. No. 12/182,637, filed Jul. 30, 2008, now U.S. Pat. No. 8,380,564. The contents of each of the foregoing are hereby incorporated by reference into this application as if set forth herein in full.

FIELD OF THE DISCLOSURE

The present disclosure relates to the field of targeted advertising.

BACKGROUND OF THE DISCLOSURE

Targeted advertisements have historically been mailed to large targeted geographic areas such as a particular city, so that regional advertisers reach only persons who are deemed by the advertiser as most likely to be responsive to their advertisements.

Advertisements are a component in digital video services, including live or pre-recorded broadcast television (TV), special or pay-per-view programming, video on demand (VOD), and other content choices available to subscribers.

DETAILED DESCRIPTION OF THE DRAWINGS

Figure 1:
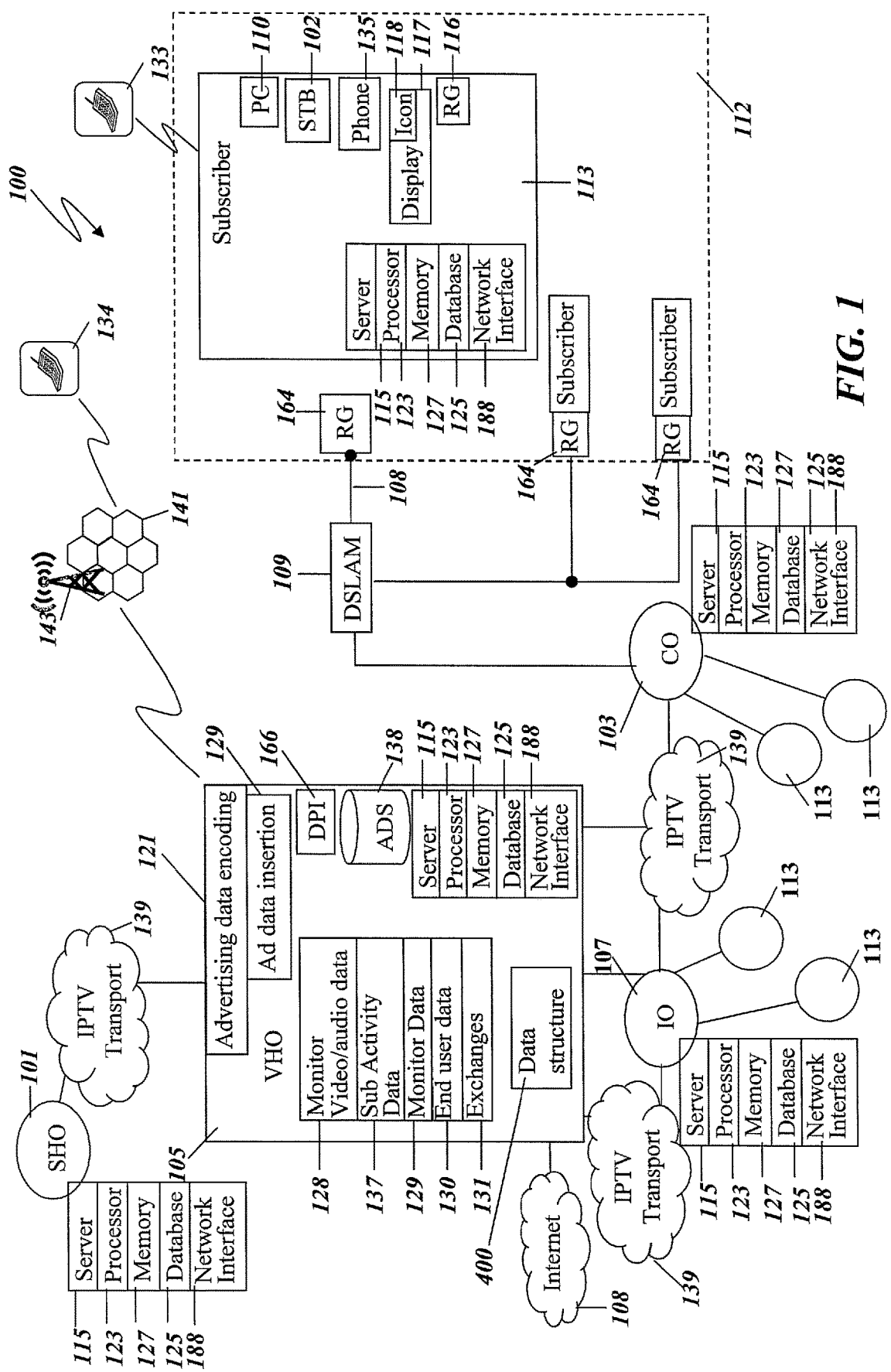
FIG. 1 depicts an illustrative embodiment of a system for delivering advertising data.

In an illustrative embodiment, an end user obtains advertising data and other information data at an end user device related to a product that appears in an internet protocol television (IPTV) video data stream. For example, an end user sees a product on television, such as a bicycle in a bicycle race. The end user, via a remote control and an end user device clicks on or selects a product such as the bicycle or a bicycle helmet that appears in a video presentation of a bicycle race that is presented in a video data presented on a display at an end user device. Upon selection of the product, the IPTV system identifies the product and sends advertising data which includes but is not limited to price, availability and technical specifications for the product.

An enhanced video icon appears on the end user device display when the enhanced advertising feature described above is available on the end user display. In a particular embodiment, a dialogue menu box opens on the end user display device showing a list of products for sale that are displayed in the accompanying program the customer is watching with a price and link to additional information and a buy button or additional information related to program i.e. recipes, parts lists, tools, required, sponsor links. The list of products offered for sale or for which additional informational data are offered varies depending on an end user profile for the end user currently associated with the end user device. If the viewer elects to purchase the listed item, the purchase price is billed to their IPTV account and the product is processed and delivered to their door by the preferred product supply and fulfillment resources.

In another embodiment, the IPTV system monitors the video data stream for occurrences of product data that can be associated with advertising data in an advertising data pool before sending it to the end user device. For example, a bicycle company may want to advertise their products when one of their products appears on television, thus, advertising data keys representing a bicycle image and audible words such as bicycle and words relating to a bicycle are placed in a system key data pool. When a bicycle image or the word bicycle or other words related to bicycle (for example, "Lance Armstrong", "Tour de France", etc.) appear in the audio data for the video data stream, the advertising key data for the bicycle are placed in the system key data pool. The advertising data keys are indices to advertising data in the advertising data pool which includes but is not limited to price data, availability data and source data.

In a particular embodiment, when an end user at an end user device clicks on the bicycle image data in the video data stream, the bicycle image data selection is sent to the IPTV system. The IPTV system takes a portion of the video data surrounding the data selected by the end user device and analyzes the data to determine the product selected by the end user. The IPTV system correlates the video data selected by the end user device with the advertising key data in system key data pool to determine which product has been selected. When a particular product is identified and associated with particular advertising key data, advertising data in the advertising data pool associated with the advertising key data are encoded into the video data stream and sent to the end user device and presented along with the bicycle data as it appears in the displayed video data stream.

In another embodiment, key data exchanges between end user devices are monitored for the presence of advertising key data or other audio and image data relating to the advertising key data. Thus, when a first end user device exchanges data with the IPTV system or another end user device, that is, sends or receives a message containing data such as an image of a bicycle or an audio expression of the word bicycle or a related word, the data exchanged is placed in an end user key data pool. The data in the end user key data pool are correlated with the advertising data pool data to determine the occurrence of key data exchanged, that is, sent and received by each end user device in the IPTV system. The IPTV system forms communities of end user devices that discuss, that is, exchange data related to a particular advertising data key, for example, "bicycles", the data key discussed above. All end users that exchange particular key data (for example, key data for the bicycle) with another end user device or with the IPTV system are placed in a key data community together. This particular key data community can be referred to as the "bicycle" key data community. All end user devices that exchange particular key data such as the "bicycle" key data with the first end user are placed in a "bicycle" key data discussion community for the first end user.

When the first end user selects the bicycle data for advertising data to be displayed during the bicycle race video presentation, a first password and icon activation data are sent to all end user devices in the "bicycle" key data community and second password data and the icon activation data are sent to all end user devices that appear both in the "bicycle" key data community and the "bicycle" key data discussion community for the first end user. The passwords are used to decode advertising data encoded into the video data sent to the end user device by the IPTV system in response to the end user selection of the bicycle image in the video data stream. Thus, separate data can be encoded into the video data stream for the "bicycle" key data community and the "bicycle" key data discussion community for the first end user. Thus, the end user devices in the "bicycle" key data community use the first password data to decode a first advertising data encoded into the video data stream and the "bicycle" key data discussion community for the first end user use the second password to decode a second advertising data encoded into the video data stream.

In another particular embodiment, a computer readable medium is disclosed containing a computer program useful in performing a method for sending advertising data to an end user device, the computer program comprising instructions to monitor video data for advertising key data; instructions to monitor end user data exchanged between end user devices for the advertising key data; instructions to receive data from an end user device indicating a product selected from a selected data segment in the video data; and instructions to send advertising data relating to key data in the selected data segment to the end user device. In another embodiment of the medium, the computer program further includes but is not limited to instructions to form a key data community of end user devices based on the data exchanged between end user devices wherein each end user device in the key data community of end user devices has exchanged data related to the key data with at least one other end user device in the key data community of end users; and instructions to send the advertising data relating to the key data to the key data community of end user devices.

In another embodiment of the medium, the computer program further includes but is not limited to instructions to form a discussion community of end users devices based on the data exchanged between end user devices wherein the discussion community of end users includes the end user device and wherein each end user device in the discussion community of end user devices has exchanged data related to the key data with the end user device; and instructions to send the advertising data relating to the key data to the end user devices in the discussion community of end user devices. In another embodiment of the medium, the advertising data is encoded in the video data, the computer program further comprising instructions to send first password data to end user devices in the key data community of end users to decode the advertising data from the video data.

In another embodiment of the medium, the advertising data is encoded in the video data, the advertising data is encoded in the video data, the computer program further comprising instructions to send second password data to end user devices in the discussion community of end user device to decode the advertising data from the video data. In another embodiment of the medium, the computer program further includes but is not limited to instructions to send activation data to end user devices indicating advertising data for a product in the video data are encoded in the video data. In another embodiment of the medium, the instructions to monitor further include but are not limited to instructions to perform video and audio content recognition on the video data and end user data to identify image data and audio data related to the advertising key data.

In another illustrative embodiment, a system is disclosed for sending advertising data to an end user device, the system including but not limited to a processor in data communication with a computer readable medium; and a computer program embedded in the computer readable medium, the computer program comprising instructions to monitor video data for advertising key data, instructions to monitor end user data exchanged between end user devices for the advertising key data, instructions to receive data from an end user device indicating a product selected from a selected data segment in the video data and instructions to send advertising data relating to key data in the selected data segment to the end user device. In another embodiment of the system, the computer program further includes but is not limited to instructions to form a key data community of end user devices based on the data exchanged between end user devices wherein each end user device in the key data community of end user devices has exchanged data related to the key data with at least one other end user device in the key data community of end users; and instructions to send the advertising data relating to the key data to the key data community of end user devices.

In another embodiment of the system, the computer program further includes but is not limited to instructions to form a discussion community of end users devices based on the data exchanged between end user devices wherein the key data discussion community of end users includes the end user device and wherein each end user device in the discussion community of end user devices has exchanged data related to the key data with the end user device and instructions to send the advertising data relating to the key data to the end user devices in the discussion community of end user devices. In another embodiment of the system the advertising data is encoded in the video data, the computer program further includes but is not limited to instructions to send first password data to end user devices in the key data community of end users to decode the advertising data from the video data.

In another embodiment of the system, the advertising data is encoded in the video data, the computer program further comprising instructions to send second password data to end user devices in the discussion community of end user device to decode the advertising data from the video data. In another embodiment of the system, the computer program further includes but is not limited to instructions to send icon activation data to end user devices indicating advertising data for a product in the video data are encoded in the video data. In another embodiment of the system, in the computer program further includes but is not limited to instructions to monitor further comprise instructions to perform image and audio content recognition on the video data and end user data to identify image data and audio data related to the advertising key data.

In another illustrative embodiment, a computer readable medium is disclosed containing computer executable instructions useful for performing a method for receiving advertising data at an end user deceive, the method including but not limited to sending data from an end user device to a server indicating a product selected in a data segment from video data received at the end user device; receiving at the end user device video data encoded with advertising data related to the product selected in the data segment; receiving password data at the end user device for decoding the advertising data encoded in the video data; and decoding at the end user device, the advertising data encoded in the video data for display at the end user device.

Turning now to FIG. 1, the IPTV system 100 delivers video data including but not limited to video data content and advertising data to subscriber households 113 and associated end user devices (also referred to herein as subscriber devices) which may be inside or outside of the household. The video data further includes but is not limited to advertising data keys which are embedded in the video and advertising data. The advertising data keys include but are not limited to text, audio, imagery and video data added to the video data and advertising data for the video. The advertising data keys are generated from an aural recognition and pattern recognition analysis of the video data and advertising data. Advertisers select particular advertising data keys categories for detection of advertising opportunities in the video data. When a particular advertising data key category is detected in a video data stream, an advertising data key is placed in the video data or an associated data stream. The advertising data keys are stored in data structure 400, which is embedded in a computer readable medium or memory, discussed below in connection with FIG. 4.

Television advertising data and advertising data keys are detected in the video data stream by content recognition computer programs and hardware in block 128 which monitors video and audio data. Data keys are extracted from advertising data in the advertising data server 138. The sensed data keys are stored in a system key data pool 416 (discussed below in connection to the data structure of FIG. 4) by the advertising data server 138. Advertising data for the products in the video data stream are encoded by software and hardware in block 129 and encoded into the video data stream by advertising data encoding software and hardware 121. In the IPTV system, IPTV channels are first broadcast as video data in an internet protocol (IP) from a server at a super hub office (SHO) 101 to a regional or local IPTV video hub office (VHO) server 103, to an intermediate office (IO) server 107 and to a central office (CO) 103. The IPTV system 100 includes a hierarchically arranged network of servers wherein a particular embodiment the SHO transmits video and advertising data to a video hub office (VHO) 103 and the VHO transmits to an end server location close to a subscriber, such as a CO server 103 or IO 107.

In another particular embodiment, each of the SHO, VHO, CO and IO are interconnected with an IPTV transport 139. The IPTV transport 139 may consist of high speed fiber optic cables interconnected with routers for transmission of internet protocol data. The IPTV servers also provide data communication for Internet and VoIP services to subscribers.

Actively viewed IPTV channels are sent in an Internet protocol (IP) data multicast group to access nodes such as digital subscriber line access multiplexer (DSLAM) 109. A multicast for a particular IPTV channel is joined by the set-top boxes (STBs) at IPTV subscriber homes from the DSLAM. Each SHO, VHO, CO, IO and STB includes a server 115, processor 123, a memory 127, network interface 188 and a database 125. Analysis of the video data for advertising data key insertion is performed by processor 123 at the VHO. The network interface functions to send and receive data over the IPTV transport. The CO server delivers IPTV, Internet and VoIP content to the subscriber via the IO and DSLAM. The television content is delivered via multicast and television advertising data via unicast or multicast depending on a target television advertising group of end user client subscriber devices to which the advertising data is directed.

In another particular embodiment, subscriber devices, also referred to herein as end user devices, are different stationary and mobile devices, including but not limited to, wire line phones 135, portable phones 133, lap top computers 118, personal computers (PC) 110 and STBs 102, 119 communicate with the communication system, i.e., IPTV system through residential gateway (RG) 164 and high speed communication lines such as IPTV transport 139. In another particular embodiment, DPI devices 166 inspect data VoIP, Internet data and IPTV video, commands and Meta data (multicast and unicast) between the end user devices (subscriber devices) which are routed through the IPTV server and between the end user devices and the IPTV system severs. DPI devices are used in analysis of the video data for detection of the advertising data keys based on advertising data categories stored in the data base 125. In a particular embodiment advertising data key forwarding and discussion of advertising data and user-to-user connectivity are detected by the DPI devices that monitor data sent between end user devices. End user source and destination identifier data included in data sent between end user devices are used to track user-to-user connectivity. Image, text and sound recognition functions are used to detect advertising data discussion and forwarding in addition to the DPI devices. Textual and aural key words and imagery found in the advertising data and messages sent and received by end user devices are inspected by the DPI devices 166 and image recognition functions in the processors 123 in the communication system servers and end user devices are used as indicators of data keys and data related to advertising data in an advertising data pool found in messages sent between users from discussions and data forwarding of the data keys and other data relating to the advertising data between users, also referred to herein as end user devices. A particular embodiment tracks discussions between end users to determine which end user devices are consummating with each other, how often and the presence of key data in their discussions. The end users identity remains anonymous.

In another illustrative embodiment data exchanges related to the product advertising data are monitored and collected whether or not the subscriber's devices are in the household 113 or mobile outside of the household such as cellular phones 134. When outside of the household, subscriber mobile device data is monitored by communication network (e.g. IPTV) servers and DPI devices which associate the product and advertising data exchanges with particular subscribers. In another particular embodiment, impression quality factors data including subscriber activity data such as communication transactions are inspected by DPI devices located in a communication system, e.g., IPTV system servers. These communication system servers route the impression quality factors data to a VHO or CO in which the impression quality factors data for a subscriber are stored for processing.

In another particular embodiment, the end user devices or subscriber devices include but are not limited to a client user computer, a personal computer (PC) 110, a tablet PC, a set-top box (STB) 102, a Personal Digital Assistant (PDA), a cellular telephone 134, a mobile device 134, a palmtop computer 134, a laptop computer 110, a desktop computer, a communications device, a wireless telephone, a land-line telephone, a control system, a camera, a scanner, a facsimile machine, a printer, a pager, a personal trusted device, a web appliance, a network router, switch or bridge, or any machine capable of executing a set of instructions (sequential or otherwise) that specify actions to be taken by that machine. In another particular embodiment, a deep packet inspection (DPI) device 124 inspects multicast and unicast data, including but not limited to VoIP data, Internet data and IPTV video, commands and Meta data between the subscriber devices and between subscriber devices and the IPTV system severs.

In another illustrative embodiment data exchanges between end users are monitored and collected whether or not the subscriber devices are in the household 113 or the devices are mobile devices 134 outside of the household. When outside of the household, subscriber mobile device data is monitored by communication system (e.g., IPTV) servers which associate the data exchanges with each particular subscriber's device. In another particular embodiment, impression quality factors data including subscriber activity data such as communication transactions are inspected by DPI devices located in a communication system, e.g., IPTV system servers. End users whom discuss or exchange data with other end users the most are classified as highly connected users (HCUs) based on the member end user discussions of advertising data keys, between the HCU and with other end users.

As shown in FIG. 1 advertising sub groups 112 (comprising a group of subscriber house holds 113) receive multicast advertising data and advertising data keys in video data stream from IO server 107 via CO 103 and DSLAM 109 at STB 102. In another particular embodiment, each STB is configured to perform DVR functionality using memory, processor and data base on board the STB. Individual households 113 receive advertising data at set top box 102 or one of the other subscriber devices. More than one STB (see STB1 102 and STB2 119) can be located in an individual household 113 and each individual STB can receive a separate multicast or unicast advertising stream on IPTV transport 139 through DSLAM 109. In another particular illustrative embodiment separate and unique advertising data are displayed at each set top box (STB) 102, 119 tailored to target the particular subscriber watching television at that particular STB. Each STB 102,119 has an associated remote control (RC) 116 and video display 117. The subscriber via the RC selects channels for a video data viewing selection (video programs, games, movies, video on demand), initiates trick play commands data to the STB/DVR and places orders for products and services over the IPTV system 100. Advertising data keys are generated and inserted at the VHO and used to select advertising data that is then sent to end user devices. In another embodiment, advertising data keys are generated at the end user devices by processors at the end user devices. Advertising data at the end user devices can then be selected for display by the end user devices based on processing of the advertising data keys described herein.

FIG. 1 depicts an illustrative communication system, including but not limited to a television advertising insertion system wherein television advertising data can be encoded and inserted at an IPTV (SHO, VHO, CO) server or at the end user client subscriber device, for example, an STB, mobile phone, web browser or personal computer. Advertising data can be encoded and inserted into an IPTV video stream via advertising insertion device 129 at the IPTV VHO server 105 or at one of the STBs 102, 109. The IPTV servers include an advertising server 138 and an advertising database 125. The advertising data is selected by advertising monitoring element 129 from the advertising database 125 based on subscriber profile also referred to as end user data 130 and delivered by the VHO advertising server 138 to the IPTV VHO server 115. End users exchange of advertising key data is monitored and stored in exchange memory 131. An SHO 101 distributes video, advertising and subscriber profile data to a regional VHO 103 which distributes data to local COs 105 which distribute data via IO 107 to a digital subscriber access line aggregator multiplexer (DSLAM) access node to subscriber devices such as STBs 102, 119, PC 110 wire line phone 135, mobile phone 133 etc. Advertising data are also selected based on the community profile for users in the community and sent to a mobile phone or computer associated with the subscriber or end user devices in the community. The community subscriber profile is built based on a community of subscriber's IPTV, Internet and VoIP activity. Subscriber activity data 137 are stored and represent advertising key data exchanged between end users during data exchanged via email, instant messages and phone etc. for each end user device and advertising key data exchanged between end user devices and the IPTV system in data exchanges during purchases, television program selection and web page surfing.

Figure 2:
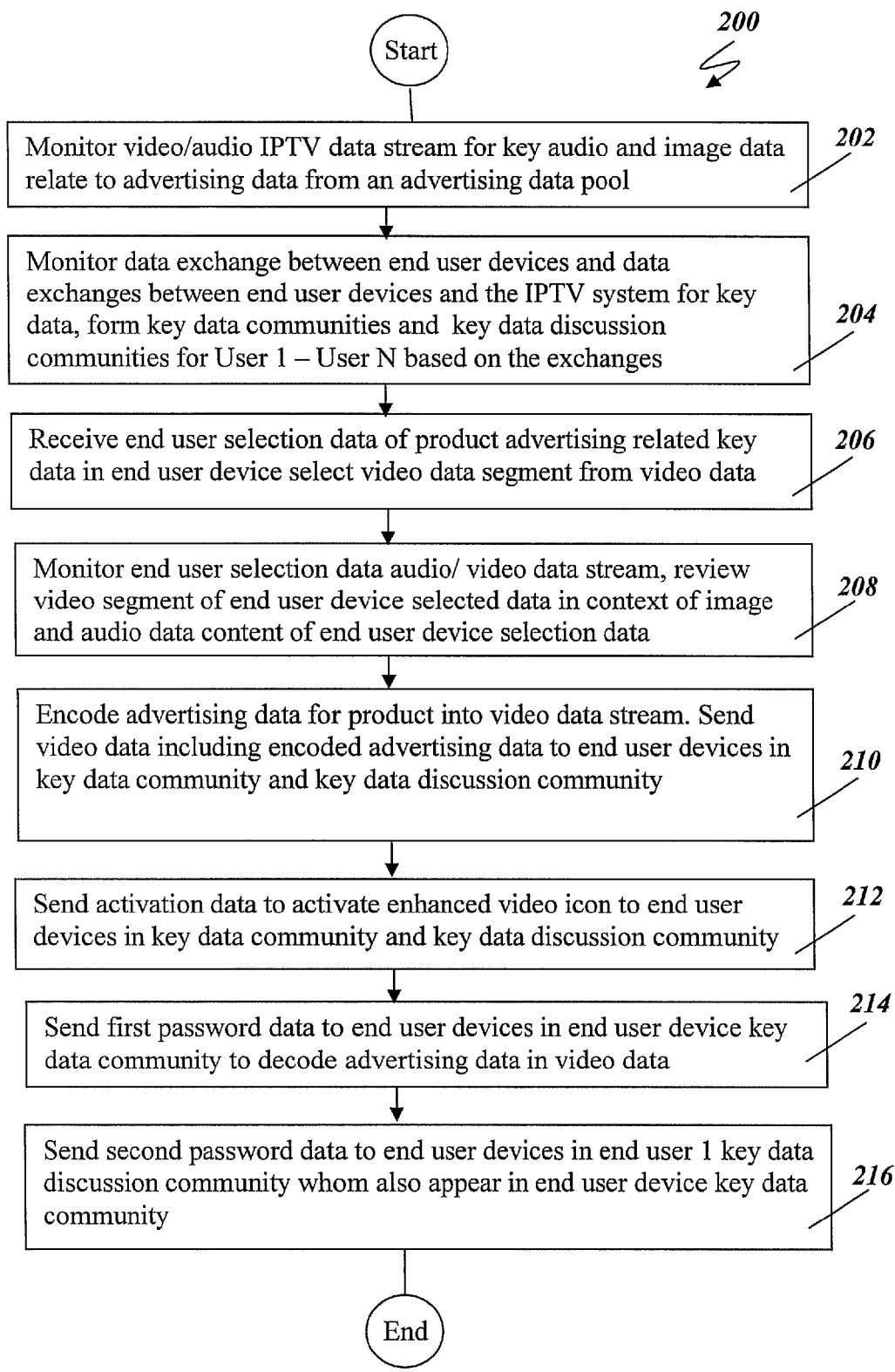
FIG. 2 depicts a flow chart of functions performed in a particular illustrative embodiment for delivering advertising data.

Turning now to FIG. 2, in a particular illustrative embodiment, at block 202, a particular illustrative embodiment monitors the IPTV video data before it is sent to the end user devices. The IPTV video data includes audio data in a video data stream. An illustrative embodiment monitor the IPTV video data in the IPTV system for image data and audio data relating to an advertising data pool 402, discussed below, and monitors the video data for key data and image data extracted from the advertising data pool. The key data includes but is not limited to audio and image data from products, such as the bicycle in the above example, that appear in the video data stream.

At block 204, an illustrative embodiment further monitors end user device 113 data exchanges for key data, including but not limited to audio key data words and image key data from end user device to end user device discussions between end user devices 1-N 113. An illustrative embodiment forms key data communities from the end user 1 through end users N and forms key data discussion communities for end user devices 1-N. An illustrative embodiment then proceeds to block 206 and receives end user device data indicating selection of product data in a video data segment from the video data stream. An illustrative embodiment then proceeds to block 208 and reviews the end user device product selection data extracted from the audio and video data stream. The end user device product selection data is included in a segment of captured keyword/image data in context of the image and audio data content of the user selection data.

An illustrative embodiment then proceeds to block 210 and encodes advertising data for the product from the end user device selection of audio and video data into the video/audio data stream. An illustrative embodiment sends the video data including the encoded advertising data to an end user devices in the key data community and the end user devices in the key data discussion community. An illustrative embodiment then proceeds to block 212 and sends activation data to activate an enhanced video icon to end user devices in the key data community and end user devices in the key data discussion community. An illustrative embodiment then proceeds to block 214 and sends first password data to end user devices in the end user key data community to decode advertising data in the video data. An illustrative embodiment proceeds to block 216 and sends second password data to end user devices in the end user key data discussion community which also appear in the end user key data community.

Figure 3:
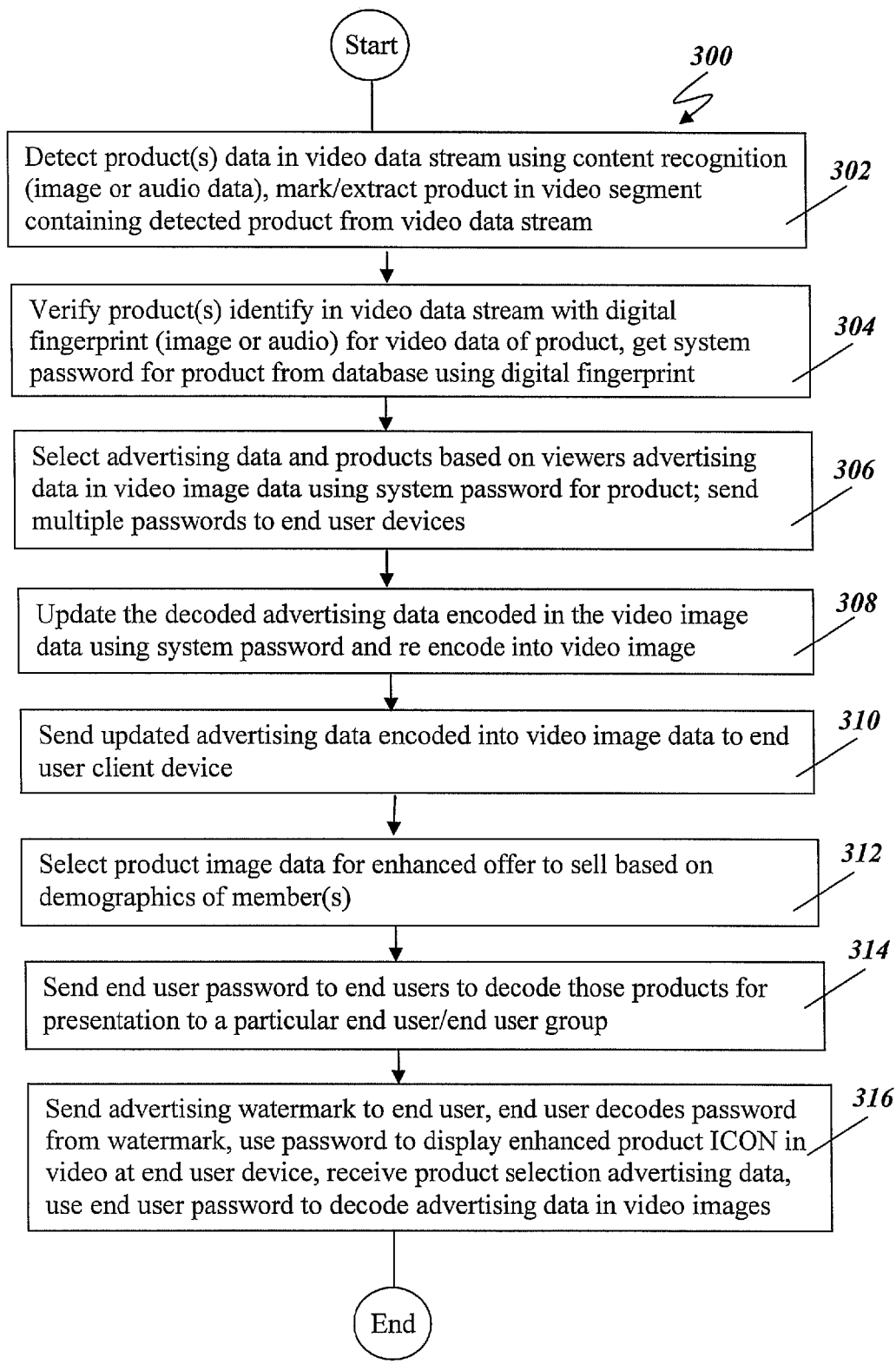
FIG. 3 depicts a flow chart of functions performed in another particular illustrative embodiment for delivering advertising data.

Turning now to FIG. 3, another particular illustrative embodiment proceeds to block 302 and detects products data in the video of data stream using content recognition software and hardware for recognition of image and audio data related to products in the video data stream that appear in the advertising data pool. A particular illustrative embodiment marks and extracts product data in a video segment from the video data stream for products selected by an end user device and for products relating to the advertising data pool. A particular illustrative embodiment proceeds to block 304 and verifies the product data identity in the video data stream with a digital fingerprint for the product image data or product audio data for the video data of the product selected.

A particular illustrative embodiment retrieves a system password for the product data from a database using the digital fingerprint. A particular illustrative embodiment proceeds to block 306 and selects advertising data and products based on the viewer's advertising data in video image data using the system password for the product data. Multiple passwords data are sent to multiple user end user devices and end user device communities, based on the key data communities and the key data discussion communities to which the end user devices belong. A particular illustrative embodiment proceeds to block 308 and updates the decoded advertising data encoded in the video data using the password and re-encodes new or updated advertising data into the video image data with the updated product data and advertising data. A particular illustrative embodiment proceeds to block 310 and sends updated advertising data encoded into the video image data to end user devices in the key data communities and end user devices in the key data discussion communities formed by the IPTV system.

An illustrative embodiment proceeds to block 312 and selects product image data for enhanced advertising product offers which are present to the end user device related to an end user selected product in the video data stream, to present advertising data, and purchase data or informational data based on the demographics of the end users associated with end user devices in the key data communities and end user devices in the key data discussion communities. The correlation is performed between the system advertising key data pool key and the end user device keyword/image pool from discussions or data exchanges between the end user devices. An illustrative embodiment proceeds to block 314 and sends password data to end user devices which the end user devices use to decode advertising and information data for the selected products for presentation to a particular end user device in an end user key data community and an end user key data discussion community.

An illustrative embodiment proceeds to block 316 and sends an advertising data watermark to end user devices and decodes a password from the watermark for use by and in user device to display the enhanced product icon in the video at being user device. An illustrative embodiment receives product selection advertising data and uses the password to decode the advertising data in the video images for display at an end user device.

Figure 4:
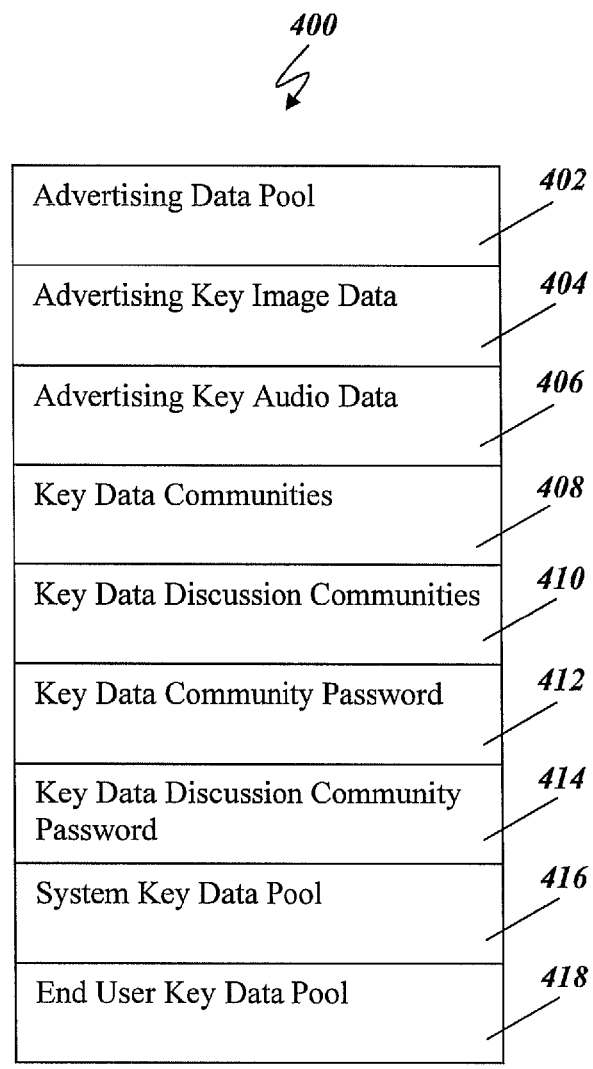
FIG. 4 depicts a data structure embedded in a computer readable medium that is used by a processor and method for delivering advertising data in a particular illustrative embodiment.

Turning now to FIG. 4, in an illustrative embodiment, a data structure is provided embedded in computer readable medium for containing data useful in performing the functions performed by the system and method disclosed herein. As shown in FIG. 4 an illustrative embodiment, a data structure is provided, including but not limited to a first data field 402 for containing the advertising data pool data containing data indicating advertising data to be sent to end user devices encoded in video data streams upon user selection of products from the video data stream. An illustrative embodiment further includes but is not limited to a second data structure field 404 for containing data indicating advertising key image data for products presented in the video data stream and presented to end users at end user devices.

An illustrative embodiment further includes but is not limited to a third field 406 in the data structure for containing data indicating advertising key audio data in the video data stream indicating products selected and presented by the system to an end-user device. An illustrative embodiment further includes but is not limited to a fourth field 408 in the data structure for containing data indicating key data communities of end user devices. An illustrative embodiment, further includes but is not limited to a fifth field 410 in the data structure for containing data indicating key data discussion communities of end user devices, which indicate end user device which discuss (exchange) key data between end users associated with end user devices in the key data discussion community of end user devices.

An illustrative embodiment further includes but not limited to a data structure field 412 for containing data indicating a key data community password to be used by the key data community end user devices for decoding advertising data and put it in the video data upon reception at end user device. An illustrative embodiment further includes a summit field in the data structure for containing data indicating a key data discussion community password for use by end user devices in the key data discussion community for decoding advertising data for products selected in the video data stream. An illustrative embodiment of the data structure further includes an eighth field 416 for containing data indicating the system key data pool for containing key data relating to the products and the advertising data pool at field 402. An illustrative embodiment of the data structure further includes a ninth field 418 for containing data indicating end user key data pool for containing data indicating the key data for products selected by the being user devices.

Figure 5:
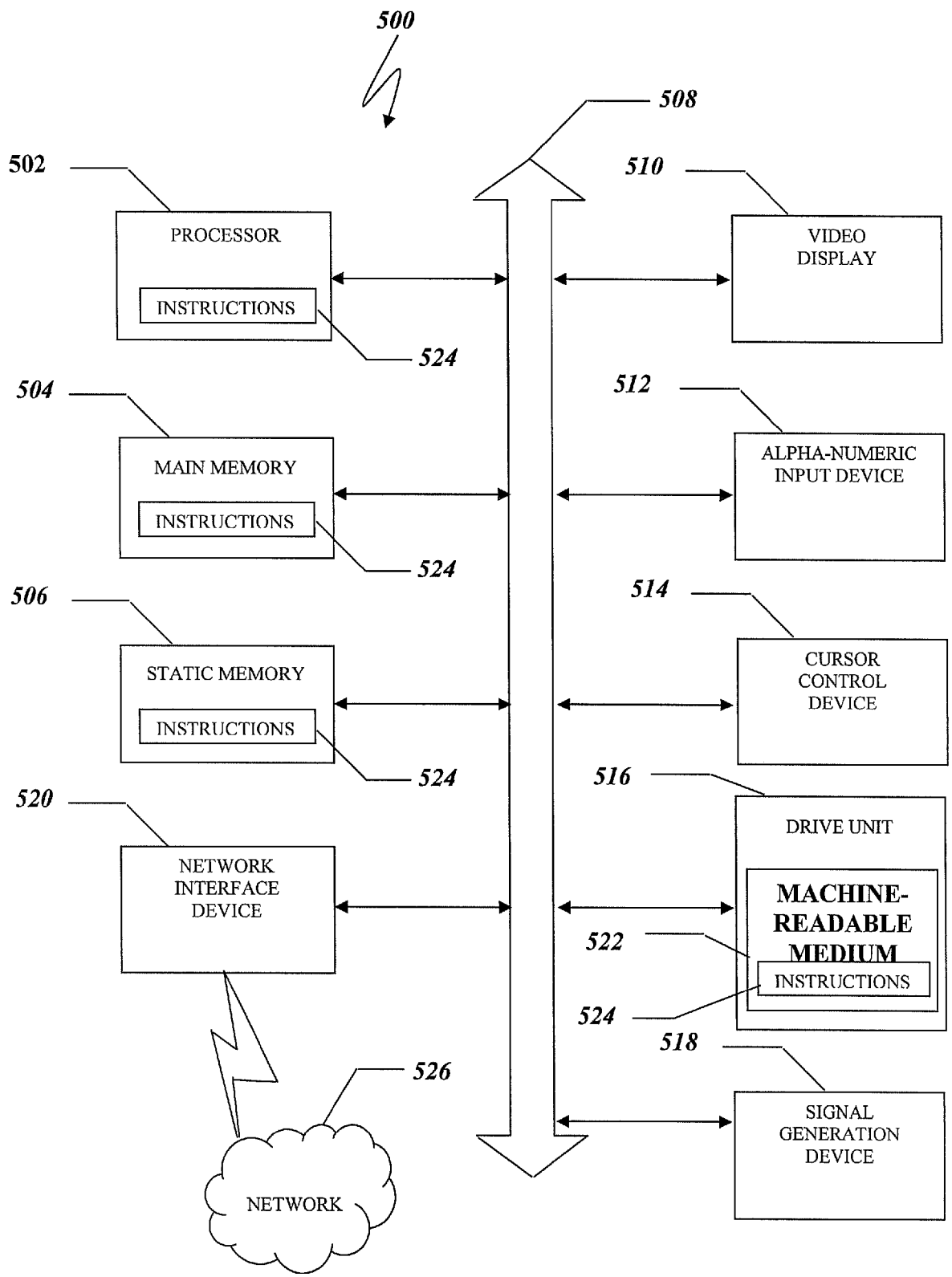
FIG. 5 depicts an illustrative embodiment of a machine for performing functions disclosed in an illustrative embodiment.

FIG. 5 is a diagrammatic representation of a machine in the form of a computer system 500 within which a set of instructions, when executed, may cause the machine to perform any one or more of the methodologies discussed herein. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a set-top box (STB), a Personal Digital Assistant (PDA), a cellular telephone, a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any machine capable of executing a set of instructions (sequential or otherwise) that specify actions to be taken by that machine.

It will be understood that a device of the present invention includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 500 may include a processor 502 (e.g., a central processing unit (CPU), a graphics processing unit (GPU), or both), a main memory 504 and a static memory 506, which communicate with each other via a bus 508. The computer system 500 may further include a video display unit 510 (e.g., liquid crystals display (LCD), a flat panel, a solid state display, or a cathode ray tube (CRT)). The computer system 500 may include an input device 512 (e.g., a keyboard), a cursor control device 514 (e.g., a mouse), a disk drive unit 516, a signal generation device 518 (e.g., a speaker or remote control) and a network interface.

The disk drive unit 516 may include a machine-readable medium 522 on which is stored one or more sets of instructions (e.g., software 524) embodying any one or more of the methodologies or functions described herein, including those methods illustrated in herein above. The instructions 524 may also reside, completely or at least partially, within the main memory 504, the static memory 506, and/or within the processor 502 during execution thereof by the computer system 500. The main memory 504 and the processor 502 also may constitute machine-readable media. Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present invention, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present invention contemplates a machine readable medium containing instructions 524, or that which receives and executes instructions 524 from a propagated signal so that a device connected to a network environment 526 can send or receive voice, video or data, and to communicate over the network 526 using the instructions 524. The instructions 524 may further be transmitted or received over a network 526 via the network interface device 520. The machine readable medium may also contain a data structure for containing data useful in providing a functional relationship between the data and a machine or computer in an illustrative embodiment of the disclosed system and method.

While the machine-readable medium 522 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the invention is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the invention is not limited to such standards and protocols. Each of the standards for Internet and other packet switched network transmission (e.g., TCP/IP, UDP/IP, HTML, and HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived there from, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A non-transitory machine-readable storage medium, comprising executable instructions that, when executed by a processor, facilitate performance of operations, comprising:
   detecting, in a video data stream, an image of a product category;
   inserting, into the video data stream, first advertising data based on the product category;
   forming a first group of a plurality of end user devices that have selected the video data stream and that have exchanged first advertising key data related to the product category, wherein exchanges of the first advertising key data by the first group of the plurality of end user devices are generated by selections, at the first group of the plurality of end user devices, of the image of the product category in the video data stream;
   sending the video data stream including the first advertising data to the first group of the plurality of end user devices;
   sending first password data to the first group of the plurality of end user devices, wherein the sending of the first password data enables the first group of the plurality of end user devices to decode the first advertising data inserted into the video data stream, wherein the first advertising data is encoded using the first password data;
   monitoring exchanges of data between the plurality of end user devices;
   forming a second group of the plurality of end user devices that have exchanged second advertising key data with the first group of the plurality of end user devices according to the monitoring; and
   sending second advertising data relating to the second advertising key data encoded using a second password to the plurality of end user devices that are in both the first group of the plurality of end user devices and the second group of the plurality of end user devices.

2. The non-transitory machine-readable storage medium of claim 1, wherein the operations further comprise sending second password data to the second group of the plurality of end user devices to decode the second advertising data.

3. The non-transitory machine-readable storage medium of claim 1, wherein the operations further comprise sending icon activation data to the first group of the plurality of end user devices indicating presence of advertising data for a product encoded in the video data stream.

4. The non-transitory machine-readable storage medium of claim 1, wherein the operations further comprise providing an advertisement watermark associated with the first advertising data.

5. A non-transitory machine-readable storage medium, comprising executable instructions that, when executed by a processor, facilitate performance of operations, comprising:
   determining a first advertising category based on image data within a video data stream;
   inserting, into the video data stream, first advertising data, wherein the first advertising data is related to a product in the first advertising category;
   forming a first group of a plurality of end user devices that have selected the video data stream and that have exchanged first key data related to the first advertising category, wherein exchanges of the first key data by the first group of the plurality of end user devices are generated by selections, at the first group of the plurality of end user devices, of the image data of the product in the video data stream;
   sending the video data stream including the first advertising data to the first group of the plurality of end user devices;
   sending first password data to the first group of the plurality of end user devices, wherein the sending of the first password data enables the first group of the plurality of end user devices to decode the first advertising data inserted into the video data stream, wherein the first advertising data is encoded using the first password data;
   monitoring exchanges of data between the plurality of end user devices;
   forming a second group of the plurality of end user devices that have exchanged second advertising key data with the first group of the plurality of end user devices; and
   sending second advertising data relating to the second advertising key data encoded using a second password to the plurality of end user devices that are in both the first group of the plurality of end user devices and the second group of the plurality of end user devices.

6. The non-transitory machine-readable storage medium of claim 5, wherein the operations further comprise sending second password data to the second group of the plurality of end user devices to decode the second advertising data.

7. The non-transitory machine-readable storage medium of claim 5, further comprising sending icon activation data to the first group of the plurality of end user devices indicating presence of the first advertising data encoded in the video data stream.

8. A method comprising:
   detecting, by a processing system including a processor, a product category from images that appear in a video data stream;
   determining, by the processing system, a point in the video data stream when the product category occurs in the video data stream;
   inserting, by the processing system, first advertising data based on the product category into the video data stream at the point where the product category occurs in the video data stream;
   forming, by the processing system, a first group of a plurality of end user devices that have selected the video data stream and that have exchanged first product data related to the product category, wherein exchanges of the first product data by the first group of the plurality of end user devices are generated by selections, at the first group of the plurality of end user devices, of an image of the product category in the video data stream;
   sending, by the processing system, the video data stream including the first advertising data to the first group of the plurality of end user devices; and
   sending, by the processing system, first password data to the first group of the plurality of end user devices, wherein the sending of the first password data enables the first group of the plurality of end user devices to decode the first advertising data inserted into the video data stream, wherein the first advertising data is encoded using the first password data;

monitoring, by the processing system, exchanges of data between the plurality of end user devices;

forming, by the processing system, a second group of the plurality of end user devices that have exchanged second advertising key data with the first group of the plurality of end user devices; and sending, by the processing system, second advertising data relating to the second advertising key data encoded using a second password to the plurality of end user devices that are in both the first group of the plurality of end user devices and the second group of the plurality of end user devices.

9. The method of claim 8, wherein the first group of the plurality of end user devises have also selected the product category as well as the video data stream.

10. The method of claim 8, wherein, in order to decode the first advertising data inserted into the video data stream, the first group of the plurality of end user devices must select the first advertising data in the video data stream.

11. The method of claim 8, wherein the detecting the product category in the video data stream comprises performing content recognition on the video data stream.

12. The method of claim 8, further comprising sending icon activation data to the first group of the plurality of end user devices indicating presence of the first advertising data in the video data stream.

13. The method of claim 12, wherein, in order to decode the first advertising data inserted into the video data stream, the first group of the plurality of end user devices must select the icon activation data.

14. The method of claim 8, further comprising sending, by the processing system, second password data to the second group of the plurality of end user devices to decode the second advertising data.

* * * * *